(12) United States Patent
Yang

(10) Patent No.: US 9,760,433 B2
(45) Date of Patent: Sep. 12, 2017

(54) FLASH MEMORY CONTROL APPARATUS UTILIZING BUFFER TO TEMPORARILY STORING VALID DATA STORED IN STORAGE PLANE, AND CONTROL SYSTEM AND CONTROL METHOD THEREOF

(71) Applicant: Silicon Motion Inc., Hsinchu County (TW)

(72) Inventor: Tsung-Chieh Yang, Hsinchu (TW)

(73) Assignee: Silicon Motion Inc., Hsinchu County (TW)

( * ) Notice: Subject to any disclaimer, the term of this patent is extended or adjusted under 35 U.S.C. 154(b) by 164 days.

(21) Appl. No.: 14/666,320

(22) Filed: Mar. 24, 2015

(65) Prior Publication Data

US 2015/0370630 A1 Dec. 24, 2015

(30) Foreign Application Priority Data

Jun. 20, 2014 (TW) .............................. 103121404 A

(51) Int. Cl.
| | |
|---|---|
| G06F 12/00 | (2006.01) |
| G06F 13/00 | (2006.01) |
| G06F 13/28 | (2006.01) |
| G06F 11/10 | (2006.01) |
| G06F 12/02 | (2006.01) |
| G06F 3/06 | (2006.01) |

(52) U.S. Cl.
CPC ...... *G06F 11/1044* (2013.01); *G06F 11/1048* (2013.01); *G06F 11/1072* (2013.01); *G06F 12/0246* (2013.01); *G06F 3/0679* (2013.01); *G06F 12/02* (2013.01); *G06F 2003/0691* (2013.01); *G06F 2212/7201* (2013.01); *G06F 2212/7205* (2013.01)

(58) Field of Classification Search
CPC ................... G06F 12/02; G06F 3/0679; G06F 2003/0691; G06F 12/0246
USPC ......................................................... 711/103
See application file for complete search history.

(56) References Cited

U.S. PATENT DOCUMENTS

| | | | |
|---|---|---|---|
| 5,640,349 | A | 6/1997 | Kakinuma |
| 2007/0028035 | A1 | 2/2007 | Nishihara |

(Continued)

FOREIGN PATENT DOCUMENTS

| | | |
|---|---|---|
| KR | 1020070015074 A | 2/2007 |
| KR | 1020070110264 A | 11/2007 |

(Continued)

*Primary Examiner* — Charles Rones
*Assistant Examiner* — Sidney Li
(74) *Attorney, Agent, or Firm* — Winston Hsu

(57) ABSTRACT

A flash memory controlling apparatus includes a data read/write interface and a controller. The data read/write interface is arranged to couple a first flash memory and a second flash memory, wherein the first flash memory includes a first storage plane and a first buffer, and the second flash memory includes a second storage plane and a second buffer. When the read/write interface couples the first flash memory and the second flash memory, the controller is arranged to temporary store a plurality of valid data stored in the first storage plane into the second buffer. After an erase cycle is performed on the first storage plane, the controller further programs the plurality of valid data temporarily stored in the second buffer into the first storage plane.

19 Claims, 3 Drawing Sheets

(56) References Cited

U.S. PATENT DOCUMENTS

2007/0283428 A1* 12/2007 Ma ..................... G06F 11/1068
726/9
2011/0029723 A1* 2/2011 Lee .................. G06K 19/07732
711/103
2011/0219179 A1 9/2011 Lee

FOREIGN PATENT DOCUMENTS

| KR | 1020140003805 A | 1/2014 |
|---|---|---|
| TW | 201007734 | 2/2010 |
| TW | 201037725 A1 | 10/2010 |
| TW | 201303718 A1 | 1/2013 |
| WO | WO 2006068963 A1 | 6/2006 |

* cited by examiner

FLASH MEMORY CONTROL APPARATUS UTILIZING BUFFER TO TEMPORARILY STORING VALID DATA STORED IN STORAGE PLANE, AND CONTROL SYSTEM AND CONTROL METHOD THEREOF

BACKGROUND OF THE INVENTION

1. Field of the Invention

The disclosed embodiments of the present invention relate to flash memory control apparatus and related control method, and more particularly, to a memory controller without including a static random access memory and a related control method.

2. Description of the Prior Art

When a conventional flash memory control circuit accesses a flash memory (e.g. a program/erase cycle), the flash memory control circuit needs to have a sufficient memory capacity to temporarily store data in the flash memory. For example, if a storage plane of the flash memory has a capacity of 8 KB, the flash memory control circuit needs to have at least one memory having a capacity of 8 KB so as to temporarily store data in the flash memory. One traditional method is to dispose a static random access memory (SRAM) in the flash memory control circuit. However, the disposal of the SRAM having a capacity of 8 KB greatly increases manufacturing costs of the flash memory control circuit. Thus, how to reduce the manufacturing costs of the flash memory control circuit has become an important issue to be solved.

SUMMARY OF THE INVENTION

It is therefore one objective of the present invention to provide a memory controller without including a static random access memory and a related control method to solve the above problems.

According to a first aspect of the present invention, an exemplary flash memory control apparatus is disclosed. The exemplary flash memory control apparatus comprises a data read/write interface and a controller. The data read/write interface is arranged for coupling a first flash memory and a second flash memory, wherein the first flash memory comprises a first storage plane and a first buffer, and the second flash memory comprises a second storage plane and a second buffer. The controller is coupled to the data read/write interface. When the read/write interface couples the first flash memory and the second flash memory, the controller is arranged to temporarily store a plurality of valid data stored in the first storage plane into the second buffer through the data read/write interface. After an erase cycle is performed on the first storage plane, the controller further programs the plurality of valid data temporarily stored in the second buffer into the first storage plane.

According to a second aspect of the present invention, an exemplary flash memory control system is disclosed. The exemplary flash memory control system comprises a first flash memory, a second flash memory, a data read/write interface and a controller. The first flash memory comprises a first storage plane and a first buffer. The second flash memory comprises a second storage plane and a second buffer. The data read/write interface is coupled to the first flash memory and the second flash memory. The controller is coupled to the data read/write interface. The controller is arranged to temporarily store a plurality of valid data stored in the first storage plane into the second buffer through the data read/write interface. After an erase cycle is performed on the first storage plane, the controller further programs the plurality of valid data temporarily stored in the second buffer into the first storage plane.

According to a third aspect of the present invention, an exemplary flash memory control method is disclosed. The exemplary flash memory control method comprises the following steps: disposing a data read/write interface to couple a first flash memory and a second flash memory, wherein the first flash memory comprises a first storage plane and a first buffer, and the second flash memory comprises a second storage plane and a second buffer; temporarily store a plurality of valid data stored in the first storage plane into the second buffer through the data read/write interface; performing an erase cycle on the first storage plane; and programming the plurality of valid data temporarily stored in the second buffer into the first storage plane.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections.

Figure 1:
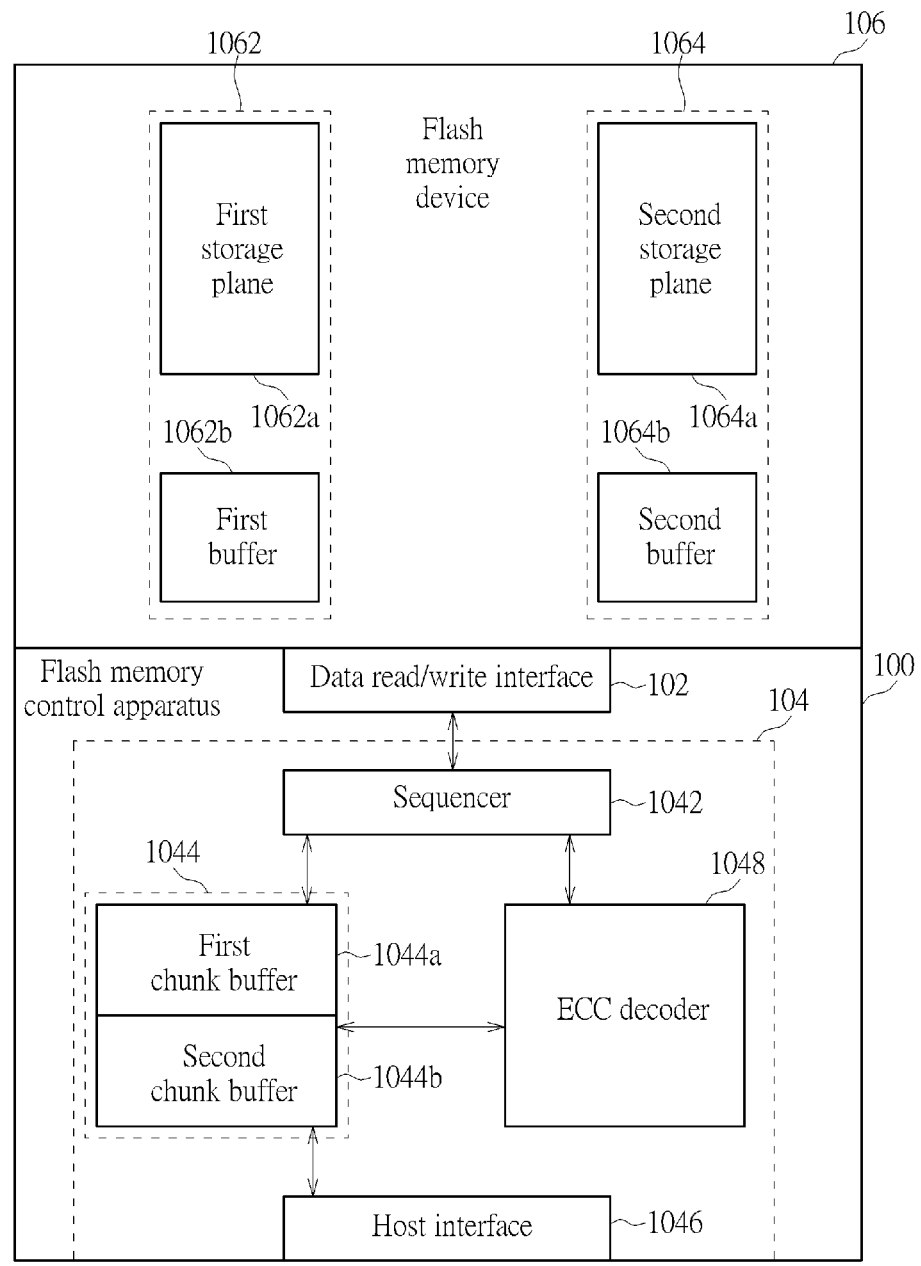
FIG. 1 is a diagram illustrating an exemplary flash memory control apparatus according to an embodiment of the present invention.

Please refer to FIG. 1, which is a diagram illustrating an exemplary flash memory control apparatus 100 according to an embodiment of the present invention. The flash memory control apparatus 100 may include a data read/write interface 102 and a controller 104. The flash memory control apparatus 100 may be used to read/write a flash memory device. For better understanding of the present invention, FIG. 1 further illustrates a flash memory device 106. The flash memory device 106 is coupled to the flash memory control apparatus 100, and may include a first flash memory 1062 and a second flash memory 1064. The first flash memory 1062 may include a first storage plane 1062*a* and a first buffer 1062*b*, and the second flash memory 1064 may include a second storage plane 1064*a* and a second buffer 1064*b*. The control 104 may include a sequencer 1042, a chunk buffer device 1044, a host interface 1046 and an error correction code (ECC) decoder 1048. Please note that, in the flash memory device 106, one storage plane may be provided in correspondence with a buffer, and the controller 104 may program data temporarily stored in the buffer into the corresponding storage plane only when the buffer is full. Further, the chunk buffer device 1044 may be implemented by a SRAM.

When the flash memory control apparatus 100 accesses the flash memory device 106, the data read/write interface 102 may be arranged to couple the first flash memory 1062 and the second flash memory 1064. In one implementation, the controller 104 may be arranged to temporarily store a plurality of valid data stored in the first storage plane 1062a into the second buffer 1064b through the data read/write interface 102, and after an erase cycle is performed on the first storage plane 1062a, the controller 104 may further program the plurality of valid data temporarily stored in the second buffer 1064b into the first storage plane 1062a. The sequencer 1042 is coupled to the data read/write interface 102, and may be arranged for determining a read/write sequence of an address of the first storage plane 1062a.

The chunk buffer device 1044 is coupled to sequencer 1042. Before the controller 104 temporarily stores the plurality of valid data into the second buffer 1064b, the chunk buffer device 1044 may be arranged to buffer each of the plurality of valid data in sequence. Before the controller 104 programs the plurality of valid data into the first storage plane 1062a, the chunk buffer device 1044 may be arranged to buffer each of the plurality of valid data in sequence. The host interface 1046 is coupled to the chunk buffer device 1044 and the ECC decoder 1048, and may be arranged for outputting a read command to instruct the sequencer 1042 to read the plurality of valid data from the first storage plane 1062a through the data read/write interface 102, and outputting a write command to instruct the sequencer 1042 to program the plurality of valid data into the first storage plane 1062a through the data read/write interface 102.

In this embodiment, the chunk buffer device 1044 may include a first chunk buffer 1044a and a second chunk buffer 1044b. Before the controller 104 temporarily stores the plurality of valid data into the second buffer 1064b, the first chunk buffer 1044a may be arranged to buffer each of the plurality of valid data in sequence. Before the controller 104 programs the plurality of valid data into the first storage plane 1062a, the second chunk buffer 1044b may be arranged to buffer each of the plurality of valid data in sequence.

Specifically, in this embodiment, when the flash memory control apparatus 100 performs an erase/program cycle on the first storage plane 1062a within the first flash memory 1062, the controller 104 may temporarily store the plurality of valid data stored in the first storage plane 1062a into the second buffer 1064b. Next, after the erase cycle is performed on the first storage plane 1062a, the controller 104 may further program the plurality of valid data temporarily stored in the second buffer 1064b into the first storage plane 1062a. For example, each of the first storage plane 1062a and the second storage plane 1064a has a storage capacity of 8 KB, each of the first buffer 1062b and the second buffer 1064b has a storage capacity of 8 KB, and each of the first chunk buffer 1044a and the second chunk buffer 1044b has a storage capacity of 1 KB, wherein the controller 104 may read only one valid data (1 KB valid data) from the first storage plane 1062a at a time. After read from the first storage plane 1062a, the 1 KB valid data may be buffered in the first chunk buffer 1044a first and then temporarily stored into the second buffer 1064b. After the 1 KB valid data is temporarily stored into the second buffer 1064b, the controller 104 may read another 1 KB valid data from the first storage plane 1062a. Similarly, the another 1 KB valid data may be buffered in the first chunk buffer 1044a first and then temporarily stored into the second buffer 1064b. By performing the aforementioned operations repeatedly, the controller 104 may store all of the plurality of valid data stored in the first storage plane 1062a into the second buffer 1064b.

Next, the controller 104 may perform an erase cycle on the first storage plane 1062a where no valid data is stored, thereby removing invalid data stored in the first storage plane 1062a and making unused spaces therein available for use. After the controller 104 completes performing the erase cycle on the first storage plane 1062a, storage spaces of the first storage plane 1062a may be released. In other words, after the controller 104 completes performing the erase cycle on the first storage plane 1062a, the first storage plane 1062a may regain the storage capacity of 8 KB. Please note that, before the first storage plane 1062a performs the erase cycle, the first storage plane 1062a may store some invalid data and have unused spaces after the first storage plane 1062a is accessed multiple times. Hence, the storage capacity of the first storage plane 1062a may be less than 8 KB. One objective of the erase cycle is to make the first storage plane 1062a regain the storage capacity of 8 KB.

After the first storage plane 1062a completes performing the erase cycle, the controller 104 has to program the plurality of valid data temporarily stored in the second buffer 1064b into the first storage plane 1062a. Similarly, the controller 104 may read only one valid data (1 KB valid data) from the second buffer 1064b at a time. After read from the second buffer 1064b, the 1 KB valid data may be buffered in the second chunk buffer 1044b first and then programmed into the first storage plane 1062a. After the 1 KB valid data is programmed into the first storage plane 1062a, the controller 104 may read another 1 KB valid data from the second buffer 1064b. Similarly, the another 1 KB valid data may be buffered in the second chunk buffer 1044b first and then programmed into the first storage plane 1062a. By performing the aforementioned operations repeatedly, the controller 104 may program all of the plurality of valid data temporarily stored in the second buffer 1064b into the first storage plane 1062a.

As will be appreciated from the above, in contrast to a conventional flash memory control circuit including a SRAM having a storage capacity of 8 KB, the proposed controller 104 can complete an erase/program operation by disposing only two chunk buffers each having a storage capacity of 1 KB (i.e. the first chunk buffer 1044a and the second chunk buffer 1044b). Hence, the proposed flash memory control apparatus may greatly reduce manufacturing costs of a flash memory controller without affecting normal operations of the flash memory controller.

Please note that, when the flash memory control apparatus 100 performs the erase/program cycle on the first storage plane 1062a of the first flash memory 1062, each of the valid data which is read from the first storage plane 1062a by the controller 104 and the valid data which is programmed into the first storage plane 1062a from the second buffer 1064b is not processed by an ECC operation. Specifically, when the controller 104 reads the valid data from the first storage plane 1062a and temporarily stores it into the second buffer 1064b, a transmission path of the valid data starts at the first flash memory 1062, passes through the data read/write interface 102, the sequencer 1042, the first chunk buffer 1044a, the sequencer 1042 and the data read/write interface 102 in sequence, and ends at the second buffer 1064b. When the controller 104 programs the valid data temporarily stored in the second buffer 1064b into the first storage plane 1062a, a transmission path of the valid data starts at the second buffer 1064b, passes through the data read/write interface 102, the sequencer 1042, the second chunk buffer 1044b, the sequencer 1042 and the data read/write interface 102 in sequence, and ends at the first flash memory 1062. In other words, when the controller 104 temporarily stores the plurality of valid data stored in the first storage plane 1062a into the second buffer 1064b, and the controller 104 programs the plurality of valid data stored in the second buffer 1064b into the first storage plane 1062a, the plurality of valid data are not transmitted through the ECC decoder 1048. In another embodiment, the host interface 1046 may further output a control signal to disable the ECC decoder 1048, thereby making the ECC decoder 1048 not perform an ECC operation on the plurality of valid data. It should be noted that the aforementioned control method is not meant to be a limitation of the present invention. Any control mechanism which makes the ECC decoder 1048 not perform an ECC operation on the plurality of valid data falls within the scope of the present invention.

As the plurality of valid data are not processed by an ECC operation, the proposed flash memory control apparatus 100 may have a faster erase/program speed.

Additionally, the storage capacity of the first chunk buffer 1044a is not limited to 1 KB. Any chunk buffer having a storage capacity less than the storage capacity of the first storage plane 1062a may be used in the flash memory control apparatus 100. Specifically, any chunk buffer which may buffer one valid data read from the first storage plane 1062a may be used in the flash memory control apparatus 100.

Further, when temporarily storing the plurality of valid data stored in the first storage plane 1062a into the second buffer 1064b, the controller 104 may randomly and temporarily store each of the plurality of valid data stored in the first storage plane 1062a into the second buffer 1064b through the data read/write interface 102. After completing performing the erase cycle on the first storage plane 1062a and before programming the plurality of valid data stored in the second buffer 1064b into the first storage plane 1062a, the controller 104 may randomly write the plurality of valid data temporarily stored in the second buffer 1064b into the first buffer 1062b. After all of the plurality of valid data stored in the second buffer 1064b are temporarily stored in the first buffer 1062b, the controller 104 may further performs a program cycle to program the plurality of valid data temporarily stored in the first buffer 1062b into the first storage plane 1062a.

Please note that although each of the first flash memory 1062 and the second flash memory 1064 shown in FIG. 1 is disposed in on the same flash memory chip (i.e. the flash memory device 106), this is not meant to be a limitation of the present invention. The first flash memory 1062 and the second flash memory 1064 may be disposed on two different flash memory chips respectively.

Although the above description involves the erase operation of the first storage plane 1062a, one skilled in the art should appreciate that the proposed flash memory control apparatus may be used to erase/program the second storage plane 1064a. When the flash memory control apparatus 100 performs an erase cycle on the second storage plane 1062b, the first buffer 1062b of the first flash memory 1062 may temporarily store a plurality of valid data stored in the second storage plane 1064a. As the erase/program operation of the second storage plane 1064a is similar to that of the first storage plane 1062a, further description is omitted here for brevity.

Moreover, as the storage capacity of the second buffer 1064b is 8 KB, and a plurality of valid data read from the first storage plane 1062a may not fill the second buffer 1064b, valid data temporarily stored into the second buffer 1064b may come from other storage plane(s). Hence, after the valid data coming from the other storage plane(s) fills the second buffer 1064b, the controller 104 performs the erase operation on one or more storage planes where no valid data is stored. Next, the controller 104 programs the 8 KB valid data temporarily stored in the second buffer 1064b into a storage plane such as the first storage plane 1062a. Please refer to FIG. 2, which is a diagram illustrating an exemplary flash memory control system 200 according to an embodiment of the present invention. The flash memory control system 200 may include a flash memory control apparatus 202 and a flash memory device 204 (e.g. a flash memory chip). The flash memory control system 200, similar to the flash memory control system 100 shown in FIG. 1, may include a data read/write interface 206 and a controller 208. The controller 208 may include a sequencer 2082, a chunk buffer device 2084, a host interface 2086 and an ECC decoder 2088. The chunk buffer device 2084 may include a first chunk buffer 2084a and a second chunk buffer 2084b. In contrast to the embodiment shown in FIG. 1, the flash memory device 204 may include four flash memories (i.e. a first flash memory 2042, a second flash memory 2044, a third flash memory 2046 and a fourth flash memory 2048). The first flash memory 2042 may include a first storage plane 2042a and a first buffer 2042b, the second flash memory 2044 may include a second storage plane 2044a and a second buffer 2044b, the third flash memory 2046 may include a third storage plane 2046a and a third buffer 2046b, and the fourth flash memory 2048 may include a fourth storage plane 2048a and a fourth buffer 2048b. Please note that the fourth flash memories may be implemented in four different flash memory chips respectively.

Figure 2:
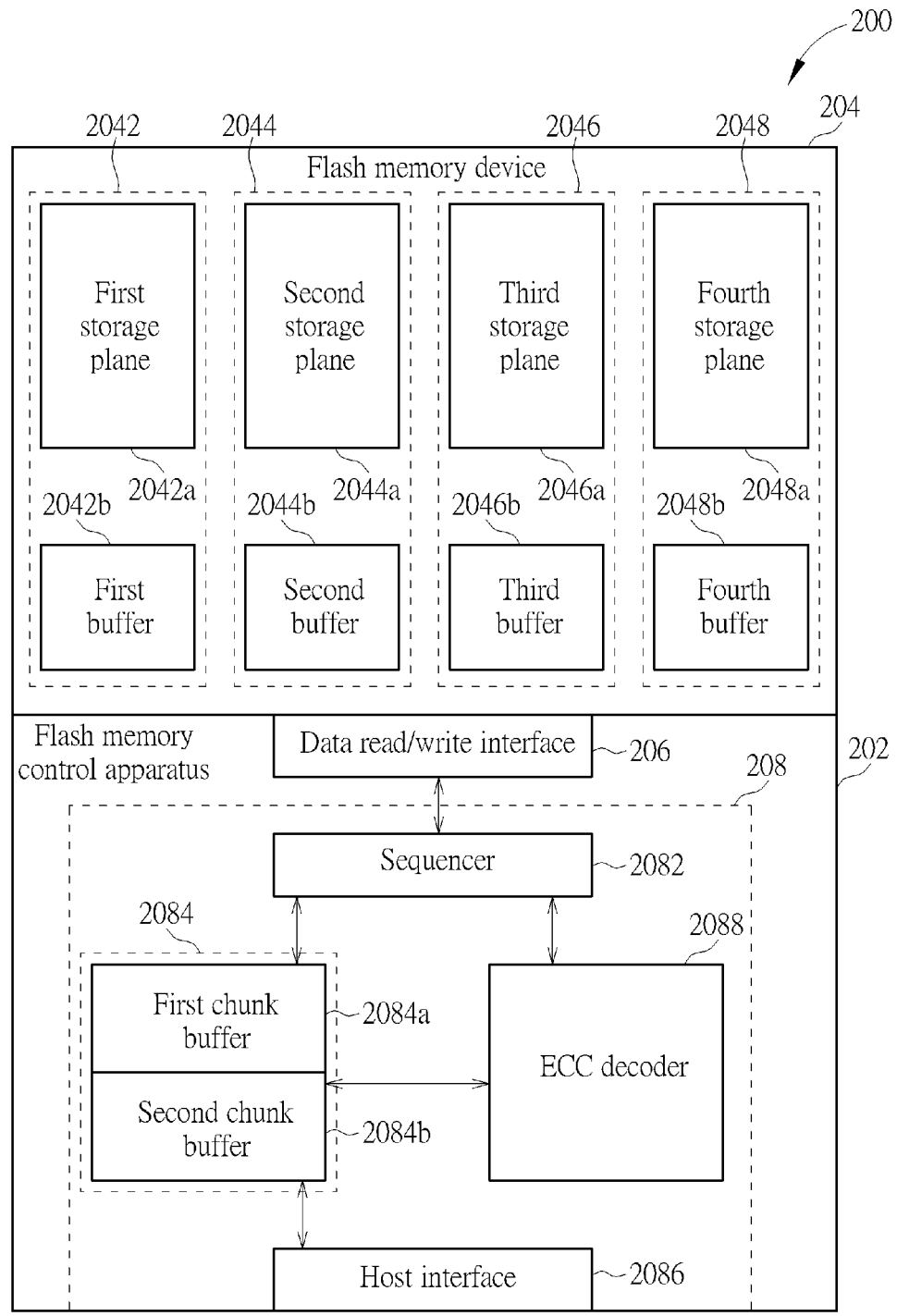
FIG. 2 is a diagram illustrating an exemplary flash memory control system according to an embodiment of the present invention.

In the embodiment shown in FIG. 2, if the controller 208 intends to perform an erase/program operation on the first storage plane 2042a, the controller 208 may first temporarily store a plurality of valid data stored in the first storage plane 2042a into the second buffer 2044b. If a data size of the plurality of valid data stored in the first storage plane 2042a is less than 8 KB, the controller 208 may temporarily store a plurality of valid data stored in the third storage plane 2046a and/or the fourth storage plane 2048a into the second buffer 2044b until 8 KB valid data is collected in the second buffer 2044b. When the second buffer 2044b collects the 8 KB valid data, the controller 208 may perform an erase operation on the first storage plane 2042a. After completing the erase operation performed on the first storage plane 2042a, the controller 208 may program the plurality of valid data temporarily stored in the second buffer 2044b into the first storage plane 2042a. Please note that, during a period in which the valid data is temporarily stored into the second buffer 2044b, the controller 208 may perform an erase operation on the third storage plane 2046a and the fourth storage plane 2048a if all of the valid data stored in the third storage plane 2046a and the fourth storage plane 2048a are temporarily stored into the second buffer 2044b completely, thus making each of the third storage plane 2046a and the fourth storage plane 2048a regain the storage capacity of 8 KB. Accordingly, spaces occupied by invalid data, as well as unused spaces, within the flash memory device 204 may be released/provided, and available spaces of the flash memory device 204 may increase.

As a person skilled in the art should readily understand the erase/program operation performed on the flash memory device 204 after reading paragraphs directed to FIG. 1, further description is omitted here for brevity.

Figure 3:
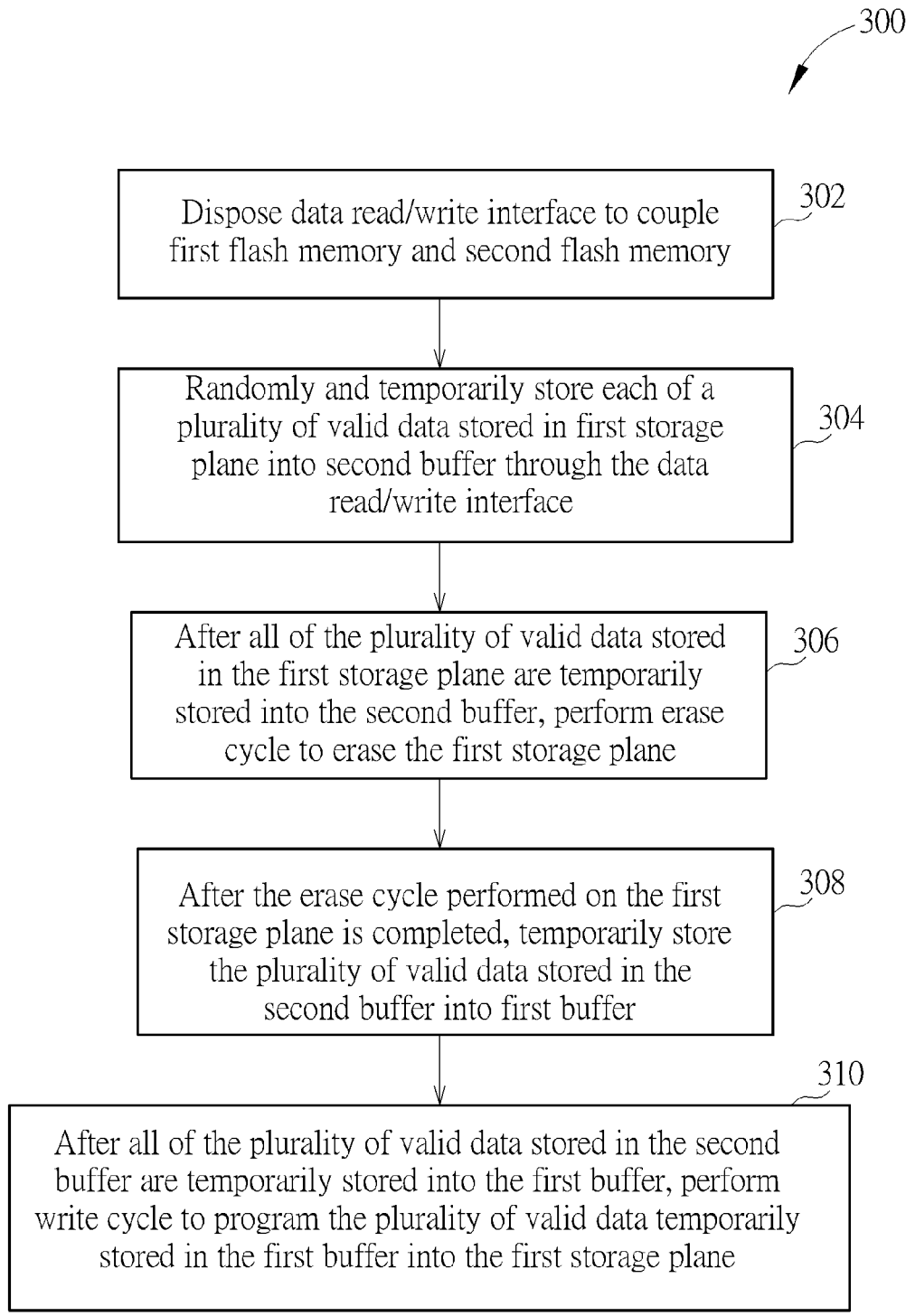
FIG. 3 is a flow chart illustrating an exemplary flash memory control method according to an embodiment of the present invention.

The aforementioned control method for the flash memory control apparatus 100 and the flash memory control apparatus 202 may be summarized in FIG. 3, which is a flow chart illustrating an exemplary flash memory control method according to an embodiment of the present invention. Provided that the result is substantially the same, the steps are not required to be executed in the exact order shown in FIG. 3 and are not required to be contiguous. In other words, other steps can be intermediate. Additionally, the flow chart shown in FIG. 3 is described with reference to the flash memory control apparatus 100 shown in FIG. 1. The flash memory control method 300 shown in FIG. 3 may be summarized as below.

Step 302: Dispose the data read/write interface 102 to couple the first flash memory 1062 and the second flash memory 1064.

Step 304: Randomly and temporarily store each of the plurality of valid data stored in the first storage plane 1062a into the second buffer 1064b through the data read/write interface 102.

Step 306: After all of the plurality of valid data stored in the first storage plane 1062a are temporarily stored into the second buffer 1064b, perform the erase cycle to erase the first storage plane 1062a.

Step 308: After the erase cycle performed on the first storage plane 1062a is completed, temporarily store the plurality of valid data stored in the second buffer 1064b into the first buffer 1062b.

Step 310: After all of the plurality of valid data stored in the second buffer 1064b are temporarily stored into the first buffer 1062b, perform a write cycle to program the plurality of valid data temporarily stored in the first buffer 1062b into the first storage plane 1062a.

Please note that, when the plurality of valid data stored in the first storage plane 1062a are temporarily stored into the second buffer 1064b, and the plurality of valid data stored in the second buffer 1064b are programmed into the first storage plane 1062a, the plurality of valid data are not processed by an ECC operation. Hence, the proposed flash memory control method 300 may have a faster erase/program speed. Additionally, spaces occupied by invalid data, as well as unused spaces, within the flash memory device 106 may be released/provided by utilizing the flash memory control method 300, thus increasing available spaces of the flash memory device 106.

To sum up, the proposed flash memory control apparatuses 100 and 202 and the flash memory control method 300 utilize a buffer of a storage plane within a flash memory chip to temporarily store all of a plurality of valid data coming from another storage plane needing to be erased/programmed, rather than directly dispose a buffer having a larger capacity within the flash memory control apparatuses 100 and 202 to temporarily store all of the plurality of valid data of the another storage plane needing to be erased/programmed. Hence, the plurality of valid data need not be processed by an ECC operation, thus increasing an operating speed of the flash memory control apparatuses 100 and 202. Additionally, as the flash memory control apparatus 100/202 needs only two chunk buffers each having a small capacity (e.g. 1 KB) to complete an erase/write cycle, the proposed flash memory control mechanism may greatly reduce manufacturing costs of a flash memory controller.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory control apparatus, comprising:
 a data read/write interface, arranged for coupling a first flash memory and a second flash memory, wherein the first flash memory comprises a first storage plane and a first buffer, and the second flash memory comprises a second storage plane and a second buffer; and
 a controller, coupled to the data read/write interface;
 wherein when the read/write interface couples the first flash memory and the second flash memory, the controller is arranged to temporarily store a plurality of valid data sets stored in the first storage plane into the second buffer through the data read/write interface; each of the plurality of valid data sets has a plurality of data bits; a data size of the plurality of valid data sets stored in the first storage plane is less than or equal to a storage capacity of the second buffer; and after an erase cycle is performed on the first storage plane, the controller further programs the plurality of valid data sets temporarily stored in the second buffer into the first storage plane.

2. The flash memory control apparatus of claim 1, wherein the controller randomly and temporarily stores each of the plurality of valid data sets stored in the first storage plane into the second buffer through the data read/write interface; after the plurality of valid data sets stored in the first storage plane are temporarily stored into the second buffer, the controller further performs the erase cycle to erase the first storage plane; and after the controller erases the first storage plane, the controller further programs the plurality of valid data sets temporarily stored in the second buffer into the first storage plane.

3. The flash memory control apparatus of claim 1, wherein when the controller temporarily store the plurality of valid data sets stored in the first storage plane into the second buffer, the controller reads only one of the plurality of valid data sets from the first storage plane at a time; and when the controller programs the plurality of valid data sets temporarily stored in the second buffer into the first storage plane, the controller programs only one of the plurality of valid data sets stored in the second buffer into the first storage plane at a time.

4. The flash memory control apparatus of claim 1, wherein before the controller programs the plurality of valid data sets temporarily stored in the second buffer into the first storage plane, the controller randomly writes the plurality of valid data sets temporarily stored in the second buffer into the first buffer; and after the plurality of valid data sets stored in the second buffer are temporarily stored in the first buffer, the controller further performs a program cycle to program the plurality of valid data sets temporarily stored in the first buffer into the first storage plane.

5. The flash memory control apparatus of claim 1, wherein the controller comprises:
 a sequencer, coupled to the data read/write interface, the sequencer arranged for determining a read/write sequence of an address of the first storage plane;
 a chunk buffer device, coupled to sequencer, wherein before the controller temporarily stores the plurality of valid data sets into the second buffer, the chunk buffer device is arranged to buffer each of the plurality of valid data sets; and before the controller programs the plurality of valid data sets into the first storage plane, the chunk buffer device is arranged to buffer each of the plurality of valid data sets; and a host interface, coupled to the chunk buffer device, the host interface arranged for outputting a read command to instruct the sequencer to read the plurality of valid data sets from the first storage plane through the data read/write interface, and outputting a write command to instruct the sequencer to program the plurality of valid data sets into the first storage plane through the data read/write interface.

6. The flash memory control apparatus of claim 5, wherein the chunk buffer device has a first storage capacity, each of the first buffer and the second buffer has a second storage capacity, and the first storage capacity is smaller than the second storage capacity.

7. The flash memory control apparatus of claim 5, wherein the chunk buffer device comprises:
a first chunk buffer, wherein before the controller temporarily stores the plurality of valid data sets into the second buffer, the first chunk buffer is arranged to buffer each of the plurality of valid data sets; and
a second chunk buffer, wherein before the controller programs the plurality of valid data sets into the first storage plane, the second chunk buffer is arranged to buffer each of the plurality of valid data sets.

8. The flash memory control apparatus of claim 7, wherein each of the first chunk buffer and the second chunk buffer has a storage capacity for storing one valid data set only.

9. The flash memory control apparatus of claim 5, wherein the controller further comprises:
an error correction code (ECC) decoder, coupled to the sequencer and the chunk buffer device;
wherein when the controller temporarily stores the plurality of valid data sets stored in the first storage plane into the second buffer, and the controller programs the plurality of valid data sets stored in the second buffer into the first storage plane, the host interface further outputs a control signal to disable the ECC decoder.

10. The flash memory control apparatus of claim 5, wherein the controller further comprises:
an ECC decoder, coupled to the sequencer and the chunk buffer device;
wherein when the controller temporarily stores the plurality of valid data sets stored in the first storage plane into the second buffer, the ECC decoder does not perform an ECC operation on the plurality of valid data sets; and when the controller programs the plurality of valid data sets stored in the second buffer into the first storage plane, the ECC decoder does not perform the ECC operation on the plurality of valid data sets.

11. A flash memory control system, comprising:
a first flash memory, comprising a first storage plane and a first buffer;
a second flash memory, comprising a second storage plane and a second buffer;
a data read/write interface, coupled to the first flash memory and the second flash memory; and
a controller, coupled to the data read/write interface;
wherein the controller is arranged to temporarily store a plurality of valid data sets stored in the first storage plane into the second buffer through the data read/write interface; each of the plurality of valid data sets has a plurality of data bits; a data size of the plurality of valid data sets stored in the first storage plane is less than or equal to a storage capacity of the second buffer; and after an erase cycle is performed on the first storage plane, the controller further programs the plurality of valid data sets temporarily stored in the second buffer into the first storage plane.

12. The flash memory control system of claim 11, wherein each of the first flash memory and the second flash memory is disposed on the same flash memory chip.

13. The flash memory control system of claim 11, wherein the first flash memory and the second flash memory are different flash memory chips.

14. A flash memory control method, comprising:
disposing a data read/write interface to couple a first flash memory and a second flash memory, wherein the first flash memory comprises a first storage plane and a first buffer, and the second flash memory comprises a second storage plane and a second buffer;
temporarily store a plurality of valid data sets stored in the first storage plane into the second buffer through the data read/write interface, wherein each of the plurality of valid data sets has a plurality of data bits, a data size of the plurality of valid data sets stored in the first storage plane is less than or equal to a storage capacity of the second buffer;
performing an erase cycle on the first storage plane; and
programming the plurality of valid data sets temporarily stored in the second buffer into the first storage plane.

15. The flash memory control method of claim 14, wherein the step of temporarily store the plurality of valid data sets stored in the first storage plane into the second buffer through the data read/write interface comprises:
randomly and temporarily stores each of the plurality of valid data sets stored in the first storage plane into the second buffer through the data read/write interface;
the step of performing the erase cycle on the first storage plane comprises:
after the plurality of valid data sets stored in the first storage plane are temporarily stored into the second buffer, performing the erase cycle to erase the first storage plane; and
the step of programming the plurality of valid data sets temporarily stored in the second buffer into the first storage plane comprises:
after the erase cycle performed on the first storage plane is completed, programming the plurality of valid data sets temporarily stored in the second buffer into the first storage plane.

16. The flash memory control method of claim 14, wherein the step of temporarily store the plurality of valid data sets stored in the first storage plane into the second buffer through the data read/write interface comprises:
reading only one of the plurality of valid data sets from the first storage plane at a time; and
the step of programming the plurality of valid data sets temporarily stored in the second buffer into the first storage plane comprises:
programming only one of the plurality of valid data sets stored in the second buffer into the first storage plane at a time.

17. The flash memory control method of claim 14, further comprising:
before the step of programming the plurality of valid data sets temporarily stored in the second buffer into the first storage plane is performed, randomly writing the plurality of valid data sets temporarily stored in the second buffer into the first buffer; and after the plurality of valid data sets stored in the second buffer are temporarily stored in the first buffer, performing a program cycle to program the plurality of valid data sets temporarily stored in the first buffer into the first storage plane.

18. The flash memory control method of claim 14, further comprising:
before the plurality of valid data sets are temporarily stored into the second buffer, utilizing a chunk buffer device to buffer each of the plurality of valid data sets;
before the plurality of valid data sets are programmed into the first storage plane, utilizing the chunk buffer device to buffer each of the plurality of valid data sets;
reading the plurality of valid data sets from the first storage plane according to a read command; and
programming the plurality of valid data sets into the first storage plane according to a write command.

19. The flash memory control method of claim 14, further comprising:
when the plurality of valid data sets stored in the first storage plane are temporarily stored into the second buffer, not performing an ECC operation on the plurality of valid data sets; and
when the plurality of valid data sets stored in the second buffer are programmed into the first storage plane, not performing the ECC operation on the plurality of valid data sets.

\* \* \* \* \*